United States Patent
Leizerovich et al.

(10) Patent No.: US 6,351,628 B1
(45) Date of Patent: Feb. 26, 2002

(54) ANTENNA SWITCHING CIRCUIT

(75) Inventors: Gustavo D. Leizerovich, Aventura; Ramon Ponce, Sunrise, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/519,428

(22) Filed: Mar. 6, 2000

(51) Int. Cl.[7] .............................. H04B 1/06; H04B 1/44
(52) U.S. Cl. .......................... 455/83; 455/78; 455/552
(58) Field of Search ................................ 455/552, 553, 455/78, 80, 82, 83, 129, 132, 133, 140, 193.1, 277.1; 333/101, 103, 104

(56) References Cited

U.S. PATENT DOCUMENTS

| | | | |
|---|---|---|---|
| 5,228,074 A | 7/1993 | Mizikovsky | 379/59 |
| 5,276,914 A | 1/1994 | Ishizuka et al. | 455/83 |
| 5,521,561 A * | 5/1996 | Yrjola et al. | 333/103 |
| 5,584,056 A | 12/1996 | Kim | 455/89 |
| 5,634,200 A | 5/1997 | Kutakubo et al. | 455/82 |
| 5,689,817 A | 11/1997 | Fok | 455/79 |
| 5,768,691 A | 6/1998 | Matero et al. | 455/78 |
| 5,809,405 A | 9/1998 | Yamaura | 455/101 |
| 5,822,684 A | 10/1998 | Kitakubo | 455/78 |
| 5,825,227 A | 10/1998 | Kohama et al. | 327/308 |
| 5,913,153 A | 6/1999 | Nakamoto et al. | 455/78 |
| 5,930,245 A | 7/1999 | Ishizuka et al. | 370/337 |
| 6,021,318 A * | 2/2000 | Schaffer | 455/78 |
| 6,072,993 A * | 6/2000 | Trikha et al. | 455/78 |
| 6,249,670 B1 * | 6/2001 | Kunkel et al. | 455/83 |

\* cited by examiner

*Primary Examiner*—Nguyen T. Vo
*Assistant Examiner*—Duc Nguyen
(74) *Attorney, Agent, or Firm*—Scott M. Garrett; James A. Lamb

(57) ABSTRACT

A PIN diode antenna RF switch especially suited for a multi-mode transceiver that includes a full duplex mode such as an AMPS analog mobile telephone. Six PIN diodes (30, 32, 34, 36, 42, 46) are configured as RF switches which are controlled by an arrangement of four DC switches (60,64,68,72) to produce a high degree of isolation in a path parallel to a duplexer (52) and low insertion loss in transmitting modes while optimizing current drain.

27 Claims, 4 Drawing Sheets

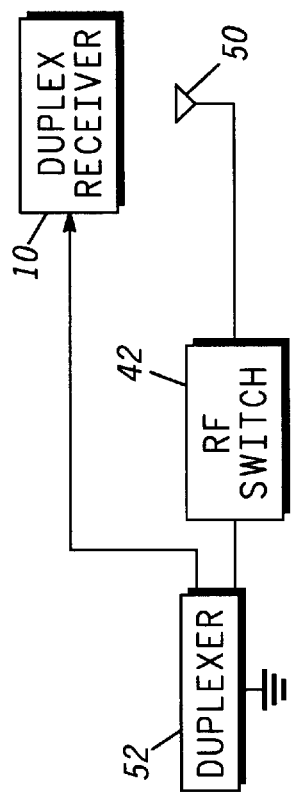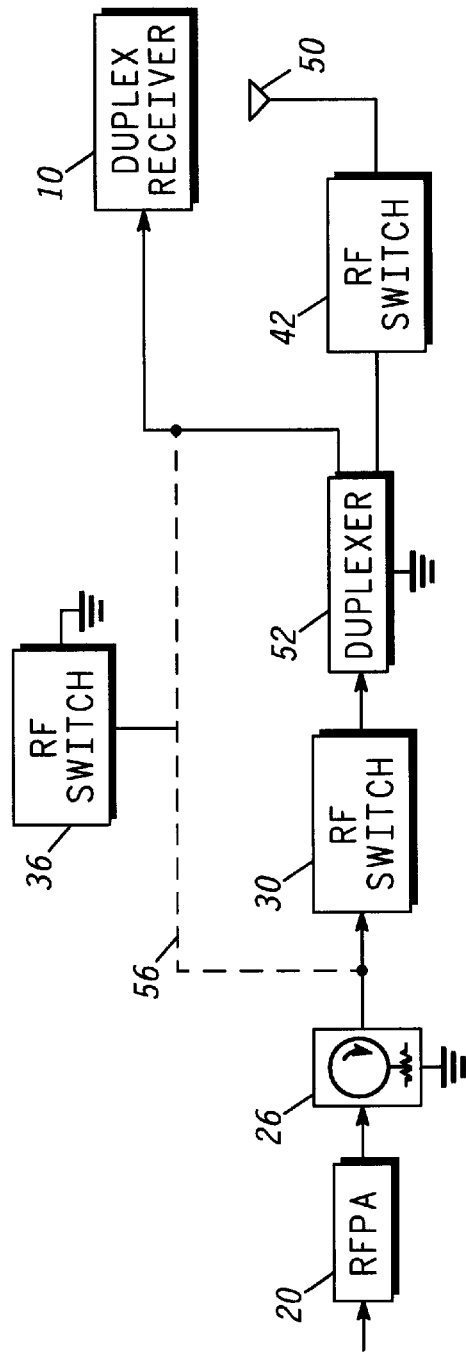

ANTENNA SWITCHING CIRCUIT

FIELD OF THE INVENTION

This invention relates generally to the field of antenna switching circuitry. More particularly, this invention relates to an antenna switching circuit arrangement for multi-mode transceivers including a full duplex mode of operation.

BACKGROUND

Antenna switches are circuits which are commonly used in radio communication devices to direct RF signals along their proper signal paths during receive and transmit functions of the radio communication device. In devices such as cellular telephones and other full duplex transceivers, transmitter and receiver circuits can be active simultaneously while sharing the same antenna. In such transceivers, the transmitted power from the transmitter power amplifier should generally be isolated with a high level of attenuation from the receiver circuitry in order to prevent the transmitted power from damaging the receiver circuitry. This is commonly implemented using a duplexer to isolate the signal paths. Those having ordinary skill in the art will appreciate that a duplexer is normally a device made up of two series band pass filtering devices with a center tap, but any other component configuration which provides the functionality of a duplexer can be used equivalently.

The advent of multi-mode transceivers substantially complicates the design requirements for antenna switching circuits while marketplace factors demand long battery life, low cost and high levels of performance. In some designs, it is particularly important to provide high linearity to effect a high adjacent channel coupled power ratio (ACCPR), even under high voltage standing wave ratio (VSWR) conditions.

It is desirable to provide an antenna switching circuit which can be used in a variety of applications thereby increasing economies of manufacturing scale while providing the required functionality across multiple configurations of multi-mode transceivers. For example, Motorola, Inc., the Assignee of the present invention, manufactures a series of radios conforming to the iDEN (Integrated Digital Enhanced Network) specification which provides two way "push to talk" type simplex communication in combination with AMPS (Advanced Mobile Phone Service) cellular telephone service. AMPS cellular telephone service is the conventional analog cellular in the United States. Other multi-mode transceiver configurations which can share this common design include iDEN/CDMA (Code Division Multiple Access), TDMA (Time Division Multiple Access)/AMPS, TETRA (Trans-European Trunk Radio) AMPS, and TETRA/CDMA. Other multi-mode transceiver configurations may also be able to adapt use of the antenna switching circuitry disclosed herein.

BRIEF DESCRIPTION OF THE DRAWINGS

The features of the invention believed to be novel are set forth with particularity in the appended claims. The invention itself, however, both as to organization and method of operation, together with objects and advantages thereof, may be best understood by reference to the following detailed description of the invention, which describes certain exemplary embodiments of the invention, taken in conjunction with the accompanying drawings in which:

FIG. 2 is a functional block diagram of an antenna switch in accordance with an embodiment of the present invention showing only closed RF switches in a first mode of operation.

FIG. 3 is a functional block diagram of an antenna switch in accordance with an embodiment of the present invention showing only closed RF switches in a second mode of operation.

DETAILED DESCRIPTION OF THE INVENTION

Figure 1:
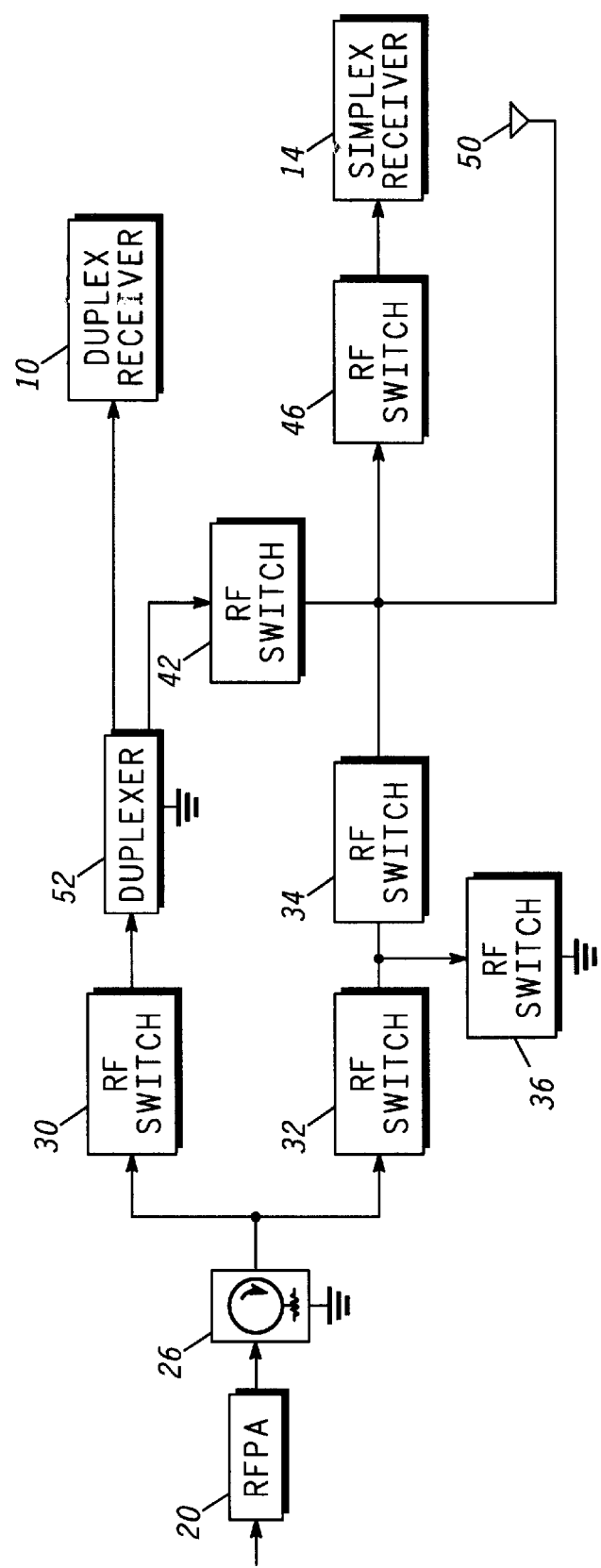
FIG. 1 is a functional block diagram of an antenna switch in accordance with an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

For purposes of the present discussion, consider a multi-mode transceiver which utilizes AMPS conventional analog telephone service combined with a two way (push to talk) style simplex transceiver in which the user activates a "push to talk" switch in order to talk and releases the "push to talk" switch to listen. In one implementation of such a transceiver, four modes of transceiver operation can be defined. These modes of operation are best understood with reference to FIG. 1.

In a first mode of operation which herein will be referred to as Mode 1, only the duplex receiver is operatively coupled to the antenna. This mode corresponds to, for example in an AMPS cellular telephone, the state wherein the telephone receiver is in standby awaiting receipt of a telephone call.

Mode 2 is full transmitter/receiver duplex operation. In this mode of operation, both a transmitter and a receiver are sharing use of the antenna. This mode generally places very high demands on the design constraints of an antenna switch.

In Mode 3, only the simplex receiver 14 is operating. This mode corresponds to receipt of signals from a user carrying out a "push to talk" type simplex transmission.

In Mode 4, the transmitter is coupled to the antenna for the "push to talk" or simplex type communication method.

For ease of explanation, the present invention is being described in terms of an antenna switching device which, in part, switches signals from an antenna to either a simplex receiver or a duplex receiver. However, those of ordinary skill in the art will recognize that only one receiver is generally active at any given time. Accordingly, while the description refers to a simplex receiver and a duplex receiver, both of these receivers may share most or all of the same components. For example, a single receiver may serve the purpose of both the simplex receiver and the duplex receiver by, for example, operating at different frequencies for each mode of operation. This might involve only a change in oscillator frequency and/or input filter frequency. That notwithstanding, the switching will be described as though there are two separate receivers, even though they may be the same physical device.

Referring now to FIG. 1 in greater detail, a transmitter circuit (not shown) provides signals to be transmitted to a radio frequency power amplifier 20 which is connected to a circulator 26 in order to provide a constant impedance load for the power amplifier 20. The output of circulator 26 is coupled to a first RF switch 30 and a second RF switch 32 so that energy can be selectively routed from RF power amplifier 20 to one of two possible paths. A third RF switch 34 is connected in series to the output of RF switch 32 and a fourth RF switch 36 is connected from the junction of RF switch 32 and RF switch 34 to radio frequency ground. The output of RF switch 34 is coupled to two more RF switches, a fifth RF switch 42 and a sixth RF switch 46. The fifth RF switch 42 is coupled further to an output of a duplexer 52. The sixth RF switch 46 is further coupled to simplex receiver 14. The junction of RF switches 34, 42 and 46 is coupled to antenna 50.

The input of duplexer 52 is connected to the output of RF switch 30 and duplex receiver 10 is also connected to an output of duplexer 52. In order to simplify the diagram of FIG. 1 (as well as FIGS. 2 through 5) it will be understood by those of ordinary skill in the art that control circuitry to selectively open and close RF switches 30, 32, 34, 36, 42 and 46 is not shown. This control can be implemented in any variety of ways including simple switch actuation by the user and more complex microcomputer or microcontroller control. A more detailed circuit arrangement that illustrates an embodiment of the control of these RF switches will be shown later.

In order to more fully appreciate the operation of the present invention in the four functional Modes described earlier, FIG. 1 has been rearranged to show only the active signal paths through RF switches in the ON position in FIGS. 2 through 5. FIGS. 2 through 5 correspond to operational Modes 1 through 4 respectively.

Referring now to FIG. 2, in Mode 1, the duplex receiver 10 is operationally coupled to antenna 50 via RF switch 42 and duplexer 52 so that radio frequency energy picked up by antenna 50 is passed through RF switch 42, duplexer 52 and is received by duplex receiver 10. In this configuration, in the context of an AMPS cellular telephone, the duplex receiver is receiving signals from antenna 50 to listen for receipt of a telephone call.

Referring now to FIG. 3, in Mode 2, duplex receiver 10 also remains active and is connected through duplexer 52 and RF switch 42 to antenna 50 to receive incoming signals. Simultaneously, however, full duplex transmissions may be taking place from the transmitter. In this mode (Mode 2) RF power amplifier 20 is supplying RF power through circulator 26 to RF switch 30. RF switch 30 is turned ON and supplies this power through duplexer 52 and RF switch 42 to the antenna 50 where the energy is radiated. Due to the need to provide multi-mode switching, as will be appreciated upon consideration of FIGS. 4 and 5, there exists a leakage signal path 56, shown by broken lines, in which RF energy from RF power amplifier 20 can bypass RF switch 30 and duplexer 52 directly to duplex receiver 10. This is generally caused by leakages through RF switches 32 and 34, which, like the other RF switches in common use, do not provide perfect RF isolation when switched in the OFF configuration. This leakage path 56 should provide less energy to duplex receiver 10 from the RF power amplifier 20 than would normally be provided by the duplexer 52. Preferably, greater than 3 dB more isolation should be provided in the leakage path 56 than through the duplexer. Duplexer 52 may, for example, provide approximately 50 dB of isolation between the transmit and receive paths. Since RF switches such as PIN diodes may typically reach 20 to 25 dB of isolation in the 800 MHz frequency band (for example), RF switch 36 is also turned ON to shunt energy to radio frequency ground to thereby provide an additional measure of isolation in this leakage path 56.

Figure 4:
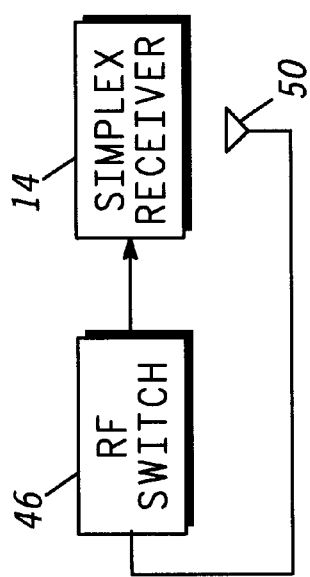
FIG. 4 is a functional block diagram of an antenna switch in accordance with an embodiment of the present invention showing only closed RF switches in a third mode of operation.

Referring now to FIG. 4, Mode 3 of the transceiver operation is illustrated. In this mode, the simplex receiver 14 is coupled through RF switch 46 directly to antenna 50. In this mode of operation, the duplexer function 52 is not utilized. The insertion loss from the antenna switch circuitry in this mode is that of a single radio frequency switch 46 thus providing minimal loss of receiver sensitivity.

Figure 5:
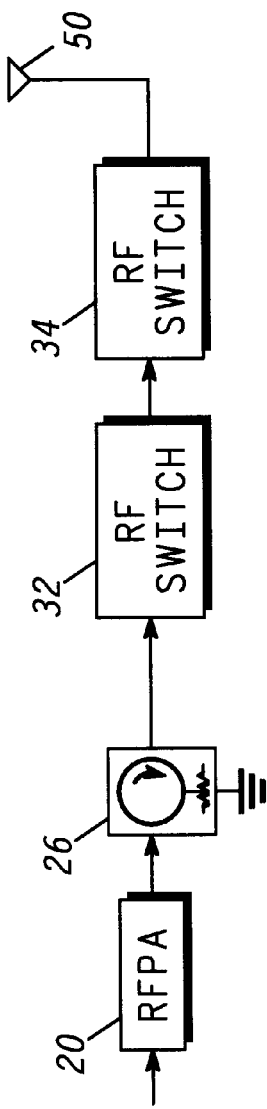
FIG. 5 is a functional block diagram of an antenna switch in accordance with an embodiment of the present invention showing only closed RF switches in a fourth mode of operation.

Referring now to FIG. 5, simplex or "push to talk" transmission is illustrated in which energy from the RF power amplifier 20 is coupled through circulator 26 to RF switch 32 and RF switch 34 to the antenna 50. In this mode of operation, it is important that power be optimally transmitted from the RF power amplifier 20 to the antenna 50 with minimal losses. Therefore, it is important that the insertion loss of RF switches 32 and 34 be minimized. The method for accomplishing this will be described in greater detail later. Any of a number of RF switching devices may be used for RF switches in various antenna switch designs. For example, mechanical relays and Gallium Arsenide field effect transistors may be used. The present implementation preferably utilizes PIN diodes as switching elements for fabricating the RF switches 30, 32, 34, 36, 42 and 46. PIN diodes can be turned ON by forward biasing the diodes and turned OFF by reverse biasing the diodes. DC switching circuits are utilized with various isolation techniques including choke inductors and bypass capacitors to separate the DC and radio frequency components in the PIN diode RF switch implementation.

The switched states for RF switches 30, 32, 34, 36, 42 and 46 are summarized in Table 1 below.

TABLE 1

| | RF SWITCH STATE X = Don't Care | | | | | |
| --- | --- | --- | --- | --- | --- | --- |
| MODE | switch30 | switch32 | switch34 | switch36 | switch42 | switch46 |
| 1 | X | X | Open | X | Closed | Open |
| 2 | Closed | Open | Open | Closed | Closed | Open |
| 3 | X | X | Open | X | Open | Closed |
| 4 | Open | Closed | Closed | Open | Open | Open |

The states shown in Table 1 as "X" are don't care states. That is, from an RF signal point of view, it does not matter what state the RF switches are in. However, from a practical point of view, the PIN diode implementation of the antenna switch to be disclosed in conjunction with FIG. 6, always selects these "don't care" states as OFF (the PIN diode reverse biased). This is to minimize current drain and thus maximize battery life in a battery powered transceiver; however, other switch configurations may be utilized.

Figure 6:
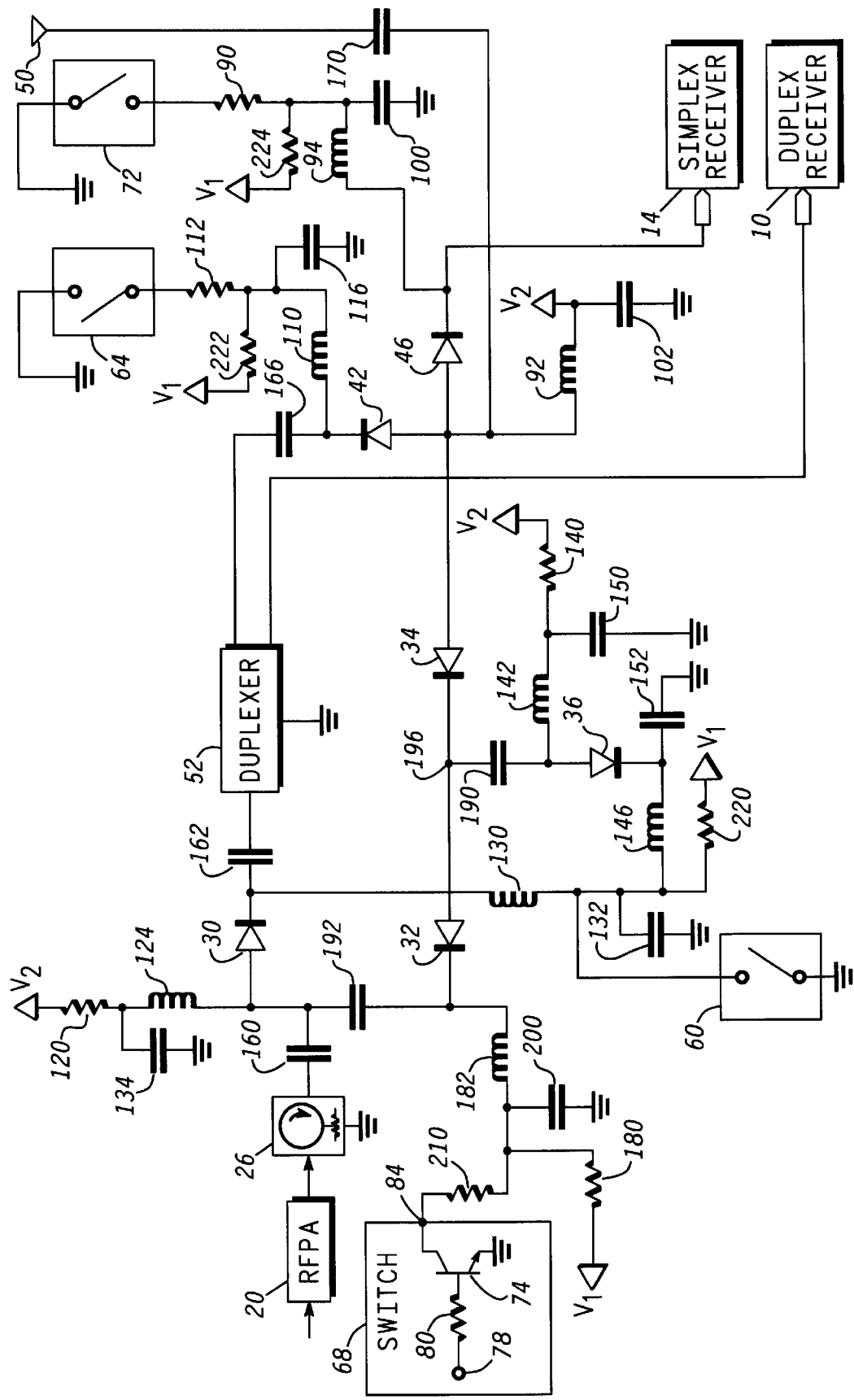
FIG. 6 is a schematic diagram of a PIN diode RF switch implementation of an embodiment of an antenna switch in accordance with an embodiment of the present invention.

Referring now to FIG. 6, a detailed schematic diagram showing a PIN diode implementation of the present invention is shown. In this implementation RF switches 30, 32, 34, 36, 42 and 46 are shown as PIN diodes 30, 32, 34, 36, 42 and 46, respectively, for clarity. The switching of PIN diodes in this embodiment is accomplished by a plurality of DC switches 60, 64, 68 and 72. These DC switches may be implemented as shown in DC switch 68 with a transistor 74 having a grounded emitter and a base coupled to a switching terminal 78 through a resistor 80. Thus, the output node of DC switch 68 is either essentially grounded (by applying a forward bias to the base emitter junction of transistor 74 via application of a positive voltage to node 78 so that the collector output terminal 84 is essentially grounded), or at an open circuit (open collector). DC switches 60, 64 and 72 are shown schematically as being either a normally open-circuit position or shorted to ground for simplicity.

Table 2 below details the bias state of each of the PIN diodes for each of the respective modes of operation. Table 3 below shows the switch state of each of the DC switches 60, 64, 68 and 72 for each of the four modes of operation according to the present implementation. In Table 3, the "G" indication in mode 4 of DC switch 68 indicates that terminal 84 is coupled to ground via turned ON transistor 74. Similarly, the G indications for modes 1 through 3 represent closed positions as the switches are shown schematically in FIG. 6.

isolation which can be obtained by turning OFF a single PIN diode through application of reverse bias. High performance PIN diodes such as the BAR 63-02W PIN diodes available from Siemens are suitable for some embodiments of this invention due to their low ON resistance (less than about 1.0 Ohm), but other devices are also suitable.

In order to understand the operation of the switching circuit of FIG. 6, the circuitry will be considered operationally mode by mode. Consider first the operation of the antenna switch of FIG. 6 operating in Mode 1. In Mode 1, DC switch 72 is closed while all of the remaining DC switches are open. This applies DC ground to the top side of resistor 90. DC current flows from $V_2$ through inductor 92 which serves as an RF choke, through diode 46, through inductor 94, to resistor 90 and then to DC ground. This forward biases diode 46 and in one embodiment provides approximately 1 mA of current through the diode turning it ON to an adequate degree to provide good sensitivity to the simplex receiver 14. The value of resistor 90 can be adjusted to effect a compromise between the amount of forward bias and thus insertion loss of diode 46 and acceptable current drain in Mode 1. Capacitors 100 and 102 provide RF isolation in conjunction with inductors 94 and 92 from the power supply $V_2$ and $V_1$.

In the second mode of operation (Mode 2—duplex transmission and reception), PIN diodes 30, 36 and 42 are forward biased while the remaining PIN diodes are reversed biased. DC switches 60 and 64 are closed. When DC switch 64 is closed, PIN diode 42 is forward biased by voltage from $V_2$ passing through inductor 92, through PIN diode 42 and in turn to inductor 110 and resistor 112 before passing through DC switch 64 to ground. Capacitors 102 and 116

TABLE 2

| | DIODE BIAS - F = forward, diode ON; R = reverse, diode OFF | | | | | |
|---|---|---|---|---|---|---|
| MODE | Diode 30 | Diode 32 | Diode 34 | Diode 36 | Diode 42 | Diode 46 |
| 1 | R | R | R | R | F | R |
| 2 | F | R | R | F | F | R |
| 3 | R | R | R | R | R | F |
| 4 | R | F | F | R | R | R |

TABLE 3

| | DC SWITCH OUTPUT STATE - O = open; G = Grounded | | | |
|---|---|---|---|---|
| MODE | Switch 60 | Switch 64 | Switch 68 | Switch 72 |
| 1 | O | G | O | O |
| 2 | G | G | O | O |
| 3 | O | O | O | G |
| 4 | O | O | G | O |

When PIN diodes are forward biased, from an AC/RF modeling point of view, they appear to be a small resistance, the value of which depends upon the amount of DC current flowing through the diode and the actual physical properties of the PIN diode. The higher the current flowing through the diode, the smaller the ON resistance (within the normal operational parameters of the PIN diode). When reverse biased, from a radio frequency modeling point of view, the diode looks predominately like a large resistor value in parallel with a very small capacitance. This small capacitance and large resistance model limits the amount of provide RF isolation for the power supplies. PIN diode 30 is forward biased by the closure of DC switch 60 which supplies a biasing current from $V_2$ through resistor 120 through inductor 124 to PIN diode 30 and in turn through inductor 130 to DC switch 60. Capacitor 132 and capacitor 134 provide RF isolation. In addition, current from $V_2$ is supplied through resistor 140 and inductor 142 to PIN diode 36 and in turn through inductor 146 through DC switch 60 to ground to turn ON (forward bias) PIN diode 36. Capacitors 150 and 152 provide RF isolation to the power supply and switch. In this mode of operation, power from the RF power amplifier 20 passes through circulator 26 and capacitor 160 to diode 30 and capacitor 162. RF energy then passes through duplexer 52 and capacitor 166 to diode 42 which is forward biased to supply RF energy through capacitor 170 to the antenna 50. In the receive path, RF energy from a signal received at antenna 50 passes through capacitor 170 to diode 42 and capacitor 166. The signal is thus delivered to duplexer 52 which in turn supplies the signal to duplex receiver 10.

In this mode of operation (Mode 2) PIN diodes 32 and 34 are reverse biased. The path for DC current providing the reverse bias is from $V_1$ through resistor 180 and inductor 182 to PIN diode 32, PIN diode 34 and forward biased diode 42, inductor 110, resistor 112 and DC switch 64 which is closed and grounded. $V_1$, in this case is selected to be large enough so that under the worse case voltage standing wave ratio conditions (VSWR), the RF energy from the RF power amplifier will not effectively forward bias diodes 32 and 34 to turn them ON. PIN diode 36 effectively shorts out, from a RF point of view, the junction of diodes 32 and 34 through capacitor 190 to RF ground through capacitor 152 so that any RF energy passing from capacitor 160 through capacitor 192 and reaching diode 32, and leaking through the stray capacitance of diode 32 is shunted to ground through forward biased PIN diode 36. Any remaining energy at node 196 is blocked by open circuited reverse biased diode 34.

This combination results in an isolation using PIN diodes that is greater than the isolation which duplexer 52 provides between receive and transmit paths. As a result, good receiver sensitivity and high ACCPR is maintained. Capacitor 200 and inductor 182 provide isolation to voltage supply $V_1$. All inductors are utilized to choke off RF energy from the DC signal paths. Resistors 120 and 140 are selected for optimal forward bias current. Generally speaking, the current through diode 36 may be much less than the current through diode 30 to achieve the desired isolation in this mode of operation.

In Mode 3, only diode 46 is forward biased by closure of DC switch 72. This produces a forward biasing current from $V_2$ through inductor 92, PIN diode 46, inductor 94 and resistor 90 to DC switch 72 and ground. Received RF energy is coupled from antenna 50 through capacitor 170 to PIN diode 46 and then to simplex receiver 14. The value of resistor 90 is selected to determine and optimize the forward bias current in diode 46. Inductor 94 and capacitor 100 provide RF isolation to DC voltage source $V_1$. Inductor 92 and capacitor 102 provide RF isolation to DC voltage source $V_2$.

In Mode 4, only DC switch 68 is closed to produce a DC ground at node 84 and forward bias PIN diodes 32 and 34. The DC circuit path for providing this forward bias is from $V_2$ through inductor 92 then to PIN diode 34 and PIN diode 32 through inductor 182, resistor 210 and DC switch 68 to ground. In this configuration, a single current path is utilized to forward bias both of PIN diodes 32 and 34 with the amount of forward bias current being dependent upon the selection of resistor 210. In this case, it is desirable to provide a very low level of insertion loss at diodes 32 and 34 so that power emanating from RF power amplifier 20 is not ineffectively dissipated by the insertion loss of PIN diodes 32 and 34 prior to reaching antenna 50. Accordingly, a significant amount of forward bias should be applied to PIN diodes 32 and 34 in order to minimize the insertion loss to, for example, less than 0.5 dB. More stringent designs may require that the forward bias current through these diodes produce an insertion loss of less than, for example, 0.3 dB or 0.2 dB. In any event, since the PIN diodes are in series, the amount of current overall required to forward bias diodes 32 and 34 is supplied in a single path in order to minimize the overall current drain on the radio's battery.

In the reverse bias configuration, only a minimal amount of current flows. Resistors 180, 220, 222 and 224 are generally selected to be large resistors such as 330 K ohms to minimize current drain while providing adequate reverse bias. The value of $V_1$, as previously stated, is selected to be large enough to prevent RF energy from forward biasing any of the PIN diodes during transmission under worst case VSWR conditions. In the current embodiment 35 V is adequate to insure that such forward biasing by RF energy does not occur. Each of the nodes illustrated as $V_1$, is diode isolated from a 35 V DC source in order to provide isolation of reverse power supply between different parts of the circuit. Resistors in series with each of the DC switches can be adjusted to determine the amount of forward bias current used to forward bias the various PIN diodes under each of the various operational modes. Thus the design is readily optimized to provide minimal current drain in receive modes while providing minimum insertion loss in the various transmit modes and high ACCPR. In Mode 4, inductor 92 and capacitor 102 provide RF isolation to DC voltage source $V_2$, while inductor 182 and capacitor 200 provide RF isolation to DC voltage source $V_1$.

While the invention has been described in conjunction with specific embodiments, it is evident that many alternatives, modifications, permutations and variations will become apparent to those of ordinary skill in the art in light of the foregoing description without departing from the spirit and scope of the invention. By way of example, and not limitation, the PIN diodes of the present invention may be replaced by equivalent mechanical or solid state switching devices including hot carrier diodes, GasFETs or relays which have suitable properties for the particular design constraints of the implementation of interest. Moreover, while the particular DC switching arrangement shown effects the desired switching of the DC bias of the PIN diodes, similar arrangements can often be devised which reverse the polarity of the PIN diodes with complementary changes to the DC biasing and DC switching. Such changes are equivalent and contemplated. Accordingly, it is intended that the present invention embrace all such alternatives, modifications and variations as fall within the scope of the appended claims.

What is claimed is:

1. An antenna switching circuit for switching signals among an antenna, an RF power amplifier, a duplex receiver and a simplex receiver, comprising:

a first RF switch having a first terminal coupled to the output of the RF power amplifier;

a second RF switch having a first terminal coupled to the output of the RF power amplifier;

a third RF switch having a first terminal coupled to a second terminal of the second RF switch;

a fourth RF switch having a first terminal coupled to the first terminal of the third RF switch and having a second terminal coupled to ground;

a fifth RF switch having a first terminal coupled to a second terminal of the third RF switch, the antenna being coupled to the first terminal of the fifth RF switch;

a duplexer having a duplex receiver output coupled to the duplex receiver, a second output coupled to a second terminal of the fifth RF switch and a third output coupled to a second terminal of the first RF switch;

a sixth RF switch having a first terminal coupled to the antenna and a second terminal coupled to the simplex receiver; and an RF switch control circuit that controls the state of the first, second, third, fourth, fifth and sixth RF switches in accordance with a mode of operation of the antenna switching circuit.

2. An antenna switching circuit in accordance with claim 1, wherein, in a first mode of operation, the fifth RF switch is closed while the third and sixth RF switches are open.

3. An antenna switching circuit in accordance with claim 1, wherein, in a second mode of operation, the first, fourth, and fifth RF switches are closed while the second, third and sixth RF switches are open.

4. An antenna switching circuit in accordance with claim 1, wherein, in a third mode of operation, the sixth RF switch is closed while the third and fifth RF switches are open.

5. An antenna switching circuit in accordance with claim 1, wherein, in a fourth mode of operation, the second and third RF switches are closed while the first, fourth, fifth and sixth RF switches are open.

6. An antenna switching circuit in accordance with claim 1, wherein:
   in a first mode of operation, the fifth RF switch is closed while the third and sixth RF switches are open;
   in a second mode of operation, the first, fourth, and fifth RF switches are closed while the second, third and sixth RF switches are open;
   in a third mode of operation, the sixth RF switch is closed while the third and fifth RF switches are open; and
   in a fourth mode of operation, the second and third RF switches are closed while the first, fourth, fifth and sixth RF switches are open.

7. An antenna switching circuit in accordance with claim 6, wherein the first, second, third, fourth, fifth and sixth RF switches comprise first, second, third, fourth, fifth and sixth PIN diodes respectively.

8. An antenna switching circuit in accordance with claim 1, wherein the first, second, third, fourth, fifth and sixth RF switches comprise first, second, third, fourth, fifth and sixth PIN diodes respectively.

9. An antenna switching circuit in accordance with claim 8, wherein the control circuit comprises means to selectively apply forward and reverse bias to the first, second, third, fourth, fifth and sixth PIN diodes in order to produce a closed state and an open state, respectively.

10. An antenna switching circuit in accordance with claim 8, wherein the second and third PIN diodes are connected in DC series and are turned ON with a single current path in the fourth mode of operation.

11. An antenna switching circuit in accordance with claim 8, wherein the second and third PIN diodes are turned ON with a current level adequate to produce less than 0.5 decibel of insertion loss in the fourth mode of operation.

12. An antenna switching circuit in accordance with claim 8, wherein the first PIN diode is turned ON with a current level adequate to produce less than 0.5 decibel of insertion loss in the second mode of operation.

13. An antenna switching circuit in accordance with claim 8, wherein the second and third PIN diodes are reverse biased and the fourth PIN diode is forward biased in the second mode of operation with bias levels adequate to achieve isolation through the second and third PIN diodes greater than the isolation provided by the duplexer from the RF power amplifier to the duplex receiver.

14. An antenna switching circuit in accordance with claim 8, wherein the control circuit provides reverse bias voltages to the PIN diodes at levels high enough to prevent the PIN diodes from being forward biased by radio frequency energy from the RF power amplifier under worst case VSWR loads.

15. An antenna switching circuit in accordance with claim 1, further comprising a circulator disposed between the RF power amplifier and a junction of the first and second RF switches.

16. An antenna switching circuit in accordance with claim 1, wherein the duplex receiver comprises an AMPS receiver.

17. An antenna switching circuit for switching signals among an antenna, an RF power amplifier, a simplex receiver and a duplex receiver, comprising:

a first PIN diode RF switch having an anode coupled to the output of the RF power amplifier;

a second PIN diode RF switch having a cathode coupled to the output of the RF power amplifier;

a third PIN diode RF switch having a cathode coupled to an anode of the second PIN diode RF switch;

a fourth PIN diode RF switch having an anode coupled to the cathode of the third PIN diode RF switch and having a cathode coupled to RF ground;

a fifth PIN diode RF switch having an anode coupled to the anode of the third PIN diode RF switch;

a duplexer having a duplex receiver output coupled to the duplex receiver, a second output coupled to a cathode of the fifth PIN diode RF switch and a third output coupled to a cathode of the first PIN diode RF switch;

the anode of the fifth PIN diode RF switch being coupled to the antenna;

a sixth PIN diode RF switch having an anode coupled to the antenna and a cathode coupled to the simplex receiver; and a control circuit, coupled to the first, second, third, fourth, fifth and sixth PIN diode RF switches which selectively applies forward and reverse DC bias to control an open or closed state of each PIN diode RF switch, so that:
   in a first mode of operation, the fifth PIN diode RF switch is forward biased while the first, second, third, fourth and sixth PIN diode RF switches are reverse biased;
   in a second mode of operation, the first, fourth, and fifth PIN diode RF switches are forward biased while the second, third and sixth PIN diode RF switches are reverse biased;
   in a third mode of operation, the sixth PIN diode RF switch is forward biased while the first, second, third, fourth and fifth PIN diode RF switches are reverse biased; and
   in a fourth mode of operation, the second and third PIN diode RF switches are forward biased while the first, fourth, fifth and sixth PIN diode RF switches are reverse biased.

18. An antenna switching circuit in accordance with claim 17, wherein the second and third PIN diode RF switches are connected in DC series and are turned ON with a single current path in the fourth mode of operation.

19. An antenna switching circuit in accordance with claim 17, wherein the second and third PIN diode RF switches are turned ON with a current level adequate to produce less than 0.5 decibel of insertion loss in the fourth mode of operation.

20. An antenna switching circuit in accordance with claim 17, wherein the first PIN diode RF switch is turned ON with a current level adequate to produce less than 0.5 decibel of insertion loss in the second mode of operation.

21. An antenna switching circuit in accordance with claim 17, wherein the second and third PIN diode RF switches are reverse biased and the fourth PIN diode RF switch is forward biased in the second mode of operation with bias levels adequate to achieve isolation through the second and third PIN diode RF switches of greater than the isolation provided by the duplexer from the RF power amplifier to the duplex receiver.

22. An antenna switching circuit in accordance with claim 17, wherein the control circuit provides reverse bias voltages to the PIN diode RF switches at levels high enough to prevent the diodes from being forward biased by radio frequency energy from the RF power amplifier under worst case VSWR loads in any mode of operation of the RF power amplifier.

23. An antenna switching circuit in accordance with claim 17, further comprising a circulator disposed between the RF power amplifier and the junction of the first and second PIN diode RF switches.

24. An antenna switching circuit in accordance with claim 17, wherein the duplex receiver comprises an AMPS receiver.

25. An antenna switching circuit in accordance with claim 17, wherein the control circuit comprises an arrangement of four DC switches to selectively apply bias to the PIN diode RF switches.

26. An antenna switching circuit in accordance with claim 17, wherein the sixth PIN diode RF switch is turned ON with a current level adequate to produce less than 0.5 decibel of insertion loss in the third mode of operation.

27. An antenna switching circuit in accordance with claim 17, wherein the fifth PIN diode RF switch is turned ON with a current level adequate to produce less than 0.5 decibel of insertion loss in the first mode of operation.

* * * * *